(12) United States Patent
Barbier (10) Patent No.: US 10,824,175 B2
(45) Date of Patent: Nov. 3, 2020

(54) AIR FLOW MEASUREMENT USING PRESSURE SENSORS

(71) Applicant: STMicroelectronics, Inc., Coppell, TX (US)

(72) Inventor: Dominique Paul Barbier, Scotts Valley, CA (US)

(73) Assignee: STMicroelectronics, Inc., Coppell, TX (US)

( * ) Notice: Subject to any disclaimer, the term of this patent is extended or adjusted under 35 U.S.C. 154(b) by 167 days.

(21) Appl. No.: 16/044,333

(22) Filed: Jul. 24, 2018

(65) Prior Publication Data

US 2019/0033897 A1    Jan. 31, 2019

Related U.S. Application Data

(60) Provisional application No. 62/538,496, filed on Jul. 28, 2017.

(51) Int. Cl.
| | |
|---|---|
| *G05D 7/06* | (2006.01) |
| *G01F 1/50* | (2006.01) |
| *G05D 23/19* | (2006.01) |
| *G06F 1/20* | (2006.01) |

(52) U.S. Cl.
CPC ............. *G05D 7/0676* (2013.01); *G01F 1/50* (2013.01); *G05D 23/1928* (2013.01); *G06F 1/20* (2013.01); *G06F 1/206* (2013.01)

(58) Field of Classification Search
None
See application file for complete search history.

(56) References Cited

U.S. PATENT DOCUMENTS

| | | | |
|---|---|---|---|
| 5,410,448 A * | 4/1995 | Barker, III | ......... H05K 7/20572 |
| | | | 361/691 |
| 8,720,282 B2 | 5/2014 | Tan | |
| 2004/0155590 A1* | 8/2004 | Belliveau | ............... G03B 21/20 |
| | | | 315/56 |
| 2007/0209653 A1* | 9/2007 | Beisheim | ............. F24F 11/0001 |
| | | | 126/80 |
| 2009/0277622 A1* | 11/2009 | Nair | ..................... F24F 11/0001 |
| | | | 165/246 |
| 2014/0092549 A1* | 4/2014 | Kodama | ............ H05K 7/20745 |
| | | | 361/679.48 |
| 2014/0261172 A1* | 9/2014 | Ito | ..................... H01L 21/67178 |
| | | | 118/712 |

(Continued)

*Primary Examiner* — Harshad R Patel
(74) *Attorney, Agent, or Firm* — Seed Intellectual Property Law Group LLP (57) ABSTRACT

Devices, systems, and methods are provided for monitoring air flow through a server using differential pressure measurements. The device includes an external pressure sensor, an internal pressure sensor, and a controller that receives the pressures from the external and internal pressure sensors. The external pressure sensor detects air pressure of the ambient air around a server enclosure, the internal pressure sensor detects air pressure through a server enclosure, and the controller calculates a pressure differential between the pressure from the external pressure sensor and the internal pressure sensor. The controller can then generate a signal based on the pressure differential, the signal optionally controlling a cooling fan, generating an interrupt for the server circuitry, or performing some other action.

20 Claims, 6 Drawing Sheets

(56) References Cited

U.S. PATENT DOCUMENTS

| | | | |
|---|---|---|---|
| 2015/0004503 A1* | 1/2015 | Yamamoto | H01M 8/2425 429/410 |
| 2015/0049589 A1* | 2/2015 | Dooley | G01L 19/00 367/137 |
| 2015/0089999 A1* | 4/2015 | Szpak | F04B 49/08 73/28.03 |
| 2016/0109389 A1* | 4/2016 | Suzuki | G01N 23/046 378/204 |
| 2016/0153604 A1* | 6/2016 | Jain | E21B 17/00 137/551 |
| 2017/0038880 A1* | 2/2017 | Kinzer | G06F 1/1684 |
| 2017/0089795 A1* | 3/2017 | Perkins | G01L 9/0051 |
| 2019/0086284 A1* | 3/2019 | MacNeil | G01K 13/00 |
| 2019/0150316 A1* | 5/2019 | Dayal | G01F 1/88 361/679.48 |

\* cited by examiner

AIR FLOW MEASUREMENT USING PRESSURE SENSORS

BACKGROUND

Technical Field

The present disclosure is directed to a system and method for detecting a pressure differential between the interior and exterior of an enclosure, and, in particular, to a system that identifies an enclosure cooling fan failure based on the pressure differential.

Description of the Related Art

Circuits, like the chips found in servers, are designed to operate within a specific temperature band. For example, one model of a microcontroller (such as STMicroelectronics' STM8 8-bit microcontroller) operates within a temperature band of 40° Celsius to 150° Celsius. As each circuit is used, power is dissipated away from the circuit in the form of heat. Usually, the heat is from current flowing through components having a resistance, with the voltage drop across each component multiplied by the current through each respective component approximately equal to the power dissipated by that component as heat. As the components produce heat, the circuit and the area around the circuit become increasingly hotter. Thus, despite ambient temperature being within the operating temperature limits of the circuit, the power dissipated by the components can cause the local temperature around the circuit to rise beyond the specific operating temperature band of the circuit. This problem is exacerbated by small volumes inside enclosures that house these circuits. The enclosures provide physical and electrical protection of the component and vary in size based on the intended use of the device. The small enclosures restrict the movement of the warm air which would otherwise rise above cooler air.

When a circuit operates outside of the specific temperature band, components may behave erratically, or be damaged. For example, the heat can affect the dielectric constant of an insulator, and an undesirable electrical short may form between various components, giving off spurious signals from the circuit. In other instances, the heat may cause signal runaway, in which current builds to the point where components are melted and permanently deformed, preventing operation of the circuit. Concern over overheating of circuits is especially concerning for large Information Technology or Business servers that rely on uninterrupted operations.

To prevent circuits from heating to a temperature outside their specific operating temperature band, some systems rely on a fan to move air flow across the circuit. The fan pushes or pulls air into or out of the enclosure to increase or decrease internal pressure with respect to the ambient pressure outside of the enclosure. The pressure differential causes cooler ambient air to move into the enclosure, and hotter local air to be moved out of the enclosure. In this way the heat generated by the circuit can be dissipated into the air without the heat building to a critical temperature outside of the specific operating temperature band. If the fan fails, the air will stop cycling through the enclosure and heat will build up in the enclosure until the circuit is stopped (intentionally or otherwise) or the cooling system is restored, such as if the fan is returned to service.

BRIEF SUMMARY

The present disclosure is directed to a system for measuring air flow through an enclosure using pressure sensors. To prevent circuit downtime or circuit damage, a diagnostic system with early detection of cooling system failure is essential. While current systems use temperature sensors adjacent to the circuitry to detect cooling system failure, by the time the temperature has been elevated outside of limits, it is already too late to act without the circuitry being damaged or needing to be turned off while the cooling system is repaired. Thus, the present disclosure is directed to measuring pressures internal and external to an enclosure to calculate air flow, and thus determine if the air cooling system is fully operational.

In some embodiments, an air flow measurement system includes an external pressure sensor, an internal pressure sensor, and a controller coupled to the external and internal pressure sensors. The controller receives pressure readings from the pressure sensors and determines a pressure differential between the external ambient air and the internal air volume inside an enclosure. This differential can then be used to evaluate the operation of a fan, with the controller optionally notifying a user that the pressures are outside of desired parameters, controlling the fan, or sending a signal to circuitry in the enclosure of undesirable pressure readings.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures associated with electronic components and fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense; that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

The present disclosure is directed to air flow measurement devices, systems, and methods for monitoring server cooling fan performance. At least two pressure sensors each determine a different pressure, with one pressure sensor positioned external to a server enclosure to determine an ambient pressure, and another pressure sensor positioned internal to the server enclosure to determine internal enclosure air pressure. The use of air flow to cool components in the server enclosure leads to detectable differences in external and internal pressures. After a calibration step to account for air flow vent/duct size and elevation, the air flow measurement system determines if the cooling system is operating within acceptable operating levels by comparing the different pressures.

Various factors can lead to a degraded cooling system in electronic systems. For example, a common cause of air flow cooling system degradation is a buildup of dust on fans of the cooling system. The buildup of dust typically leads to a slowing of the fan rotational speed over time for a given power level, which in turn reduces the air flow across components in the server enclosure, which increases the amount of heat buildup. Alternatively, a fan failure can occur in which the fan stops turning entirely, such as from a power surge damaging the fan motor. Other causes can also lead to air flow degradation, such as fan blade weakness or thin atmosphere because of altitude, which can be detected by the air flow measurement system. The detection of a degraded cooling system from air flow degradation can occur much faster than detection of cooling system degradation from the temperature rising outside of the specific operating temperature range of the various devices.

If the air flow measurement system determines that a cooling system is not operating within a specific range, it can provide any number of different actions. For example, in some embodiments the air flow measurement system can control a fan of the cooling system so that if inadequate air flow is detected, the fan power level is changed to change air flow, such as increase the fan power level to increase air flow. In another example, the air flow measurement system can generate a warning interrupt for circuitry in the server enclosure, such that the circuitry in the server can decrease heat production proactively, such as by slowing clock speeds or starting a graceful shutdown sequence by ending running processes. In yet another example, the air flow measurement system can report status to an external monitoring system for one or more servers. These and other responses can occur in isolation, or in conjunction with any other response.

Figure 1:
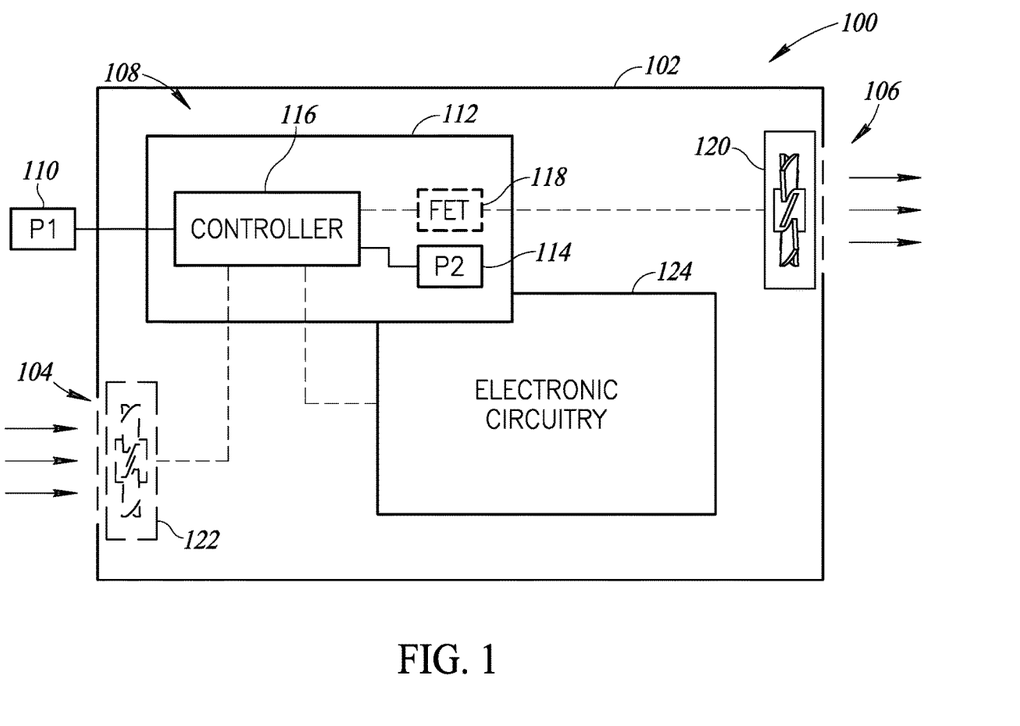
FIG. 1 is a block diagram of an electronics package incorporating one embodiment of an air flow measurement system.

FIG. 1 is a block diagram of an electronics package incorporating one embodiment of an air flow measurement system. The electronics package shown is a server 100 having an enclosure 102. The electronics package can alternatively be any one of many different electronics packages, such as a personal computer, a business computer, a mobile device, or an application specific integrated circuit device. The enclosure 102 may also be referred to as a case, tower, or chassis, among other things. The enclosure is shown with a rectangular shape in this Figure, but other shapes are envisioned.

For an exemplary 1 rack unit (1U) server enclosure, the approximate dimensions are a width of 19 inches, a length of 36 inches, and a height of 1.75 inches. For enclosures with greater multiples of rack units, the height increases according to the number of rack units multiplied by 1.75 inches, with a 2U server enclosure having an approximate height of 3.5 inches. The enclosure 102 includes an inlet vent 104 and an outlet vent 106 that allow ambient air around the enclosure to flow into the enclosure 102, and internal air inside the enclosure 102 to be discharged into the ambient air.

Included in the server 100 is an air flow measurement system 108. The air flow measurement system 108 includes at least an external pressure sensor (P1) 110, and an internal air flow circuit 112 with an internal pressure sensor (P2) 114, and a controller 116. The external pressure sensor 110 is mounted to an external surface of the enclosure 102 and is coupled to the controller 116 to communicate to the controller 116. Alternatively, the external pressure sensor 110 is mounted away from the enclosure 102. The external pressure sensor 110 measures the ambient air pressure, or the external pressure. The internal pressure sensor 114 and the controller 116 are mounted to the internal air flow circuit 112, such as a printed circuit board, or are components of a unitary circuit or chip. The internal air flow circuit 112 is mounted to an internal surface of the enclosure 102. The internal pressure sensor 114 is coupled to and in communication with the controller 116. Alternatively, the external pressure sensor 110 is mounted away from the controller 116, with the internal air flow circuit representing electrically coupled components that are physically displaced from one another inside the enclosure. In another embodiment, the controller 116 is not in the enclosure 102. The internal pressure sensor 114 resides in and measures the internal air pressure for the enclosure cavity. Different components in the enclosure 102 may have the effect of segmenting the cavity of the enclosure 102 into smaller cavities with different pressure levels, with the position of the internal pressure sensor 114 controlling which cavity pressure level is detected.

In one embodiment, the pressure sensors 110, 114 are first calibrated with all other equipment off and with the server 100 at a steady state thermally, electrically, and mechanically. The internal pressure sensor 114 is biased to match the external pressure sensor 110. Additionally, the external pressure sensor 110 is used to determine pressure altitude. With the pressure altitude calculated, and the vent dimensions known or programmed in, the air flow measurement system 108 can calculate an air flow rate in the enclosure 102 based on the difference in pressures detected by the external pressure sensor 110 and the internal pressure sensor 114. The air flow rate is a function of the pressure differential, and thus minimum air flow rates can be compared to the calculated air flow rate or minimum pressure differentials compared to the calculated pressure differential.

The controller 116 outputs a signal based on the calculated pressure differential. The signal output from the controller 116 can be an air cooling system control signal, a temperature warning signal, an air flow signal, or some other signal. An air cooling system control signal can be provided to a fan driver (FET) 118 which generates a power signal to drive an outlet fan 120 coupled to the outlet vent 106 at an interior surface of the enclosure 102, or the controller 116 can be coupled directly to an inlet fan 122 coupled to the inlet vent 104 at an interior surface of the enclosure 102 and provide a power signal to drive the inlet fan 122. In other embodiments, one or both of the fans 120, 122 are repositioned, reversed, or removed. The fan driver 118 can be any one of a number of motor controllers, such as a field effect transistor (FET) or any other amplifier circuit.

The air cooling system control signal drives the fans at a driving air flow rate based on the pressure differential. If the detected pressure differential is lower than an expected pressure differential by a threshold amount, the controller 116 can cause the outlet fan 120 or the inlet fan 122 to be driven at a higher power level, with the threshold amount being any number, including zero. Conversely, if the detected pressure differential is higher than the detected pressure differential by more than a threshold amount, then the controller 116 can cause the outlet fan 120 or the inlet fan 122 to be driven at a lower power level. For example, if a fan is be driven using pulse width modulation (PWM) set at a pulse width of 25% of a period of the power signal, and insufficient air flow is detected, the controller can cause the pulse width to increase to 50%, 75%, or 100% with one or more stages to reach the desired pulse width. And if air flow is higher than expected or desired, the pulse width can be decreased to 10% or 0%. The number and range of the selectable power settings is can be varied to include any power setting between −100% to +100%.

The system is adaptable to a variety of server arrangements. As noted above, the server enclosure may include one circuit board that houses electronic circuitry 124 or may include a plurality of circuit boards, each housing electronic circuitry 124. The system 100 can be integrated within one of the circuit boards housing electronic circuitry 124 or may be sold as a stand-alone system, which can be easily integrated into existing server stacks.

In various embodiments, the system may include a single external pressure sensor 110 and multiple internal pressure sensors all coupled to the controller. For example, if there are several circuit boards, each one could include an internal pressure sensor to reflect the pressure at that circuit board.

If the internal air flow circuit 112 determines that the air flow within the enclosure 102 is not within a threshold range, the air flow circuit 112 can adjust the each of the fans 120, 122. For example, if system determines more air should be moved through the enclosure, the fan speed can be increased. After increasing the fan speed, the controller 116 can continue to monitor the air flow. If the air flow does not increase proportionally with respect to the increase in fan speed, the controller can trigger the interrupt to notify a remote user of a potential issue, such as dust blocking the vents. This feedback loop of detecting pressure, adjusting a motor of the fans, and detecting pressure, gives the system a robust view and control over the air pressure. This gives server users broad server management options to know about potential fan failures before a failure occurs.

In some embodiments, the controller 116 can issue the temperature warning signal based on the detected pressure differential being lower than the expected pressure differential, based on a detected temperature at one of the pressure sensors 110, 114, or based on come combination of detected pressures and temperatures. The pressure sensor can be used to account for any lag in the detected temperature. For example, if a threshold temperature is reached and power is cut to the device, additional heating can occur from heat produced inside the system that has not yet propagated to the surface of the components. Thus, heat can sometimes be a suboptimal trigger for controlling an air flow management system, but be supplemented with the detected pressure differentials to compensate.

The temperature warning signal may be communicated to the electronic circuitry 124 inside the server 100 or to some other device. In some cases the temperature warning signal is an interrupt signal or flag which causes other processes to be stopped while the temperature warning signal is processed. If the electronic circuitry 124 receives the temperature warning signal, the electronic circuitry 124 can respond by decreasing clock rate of the electronic circuitry 124 or starting a graceful shutdown of one or more processes to decrease the electronic load, thereby decreasing heat production proactively. In some embodiments, the electronic circuitry can generate an air cooling system control signal that changes the cooling rate of the air cooling system. In other embodiments, the electronic circuitry 124 can receive the temperature warning signal from the controller 116 and generate a warning to be communicated to a user through an input/output device. Alternatively the temperature warning signal can be communicated by the controller 116 to the user without being routed through the electronic circuitry 124.

In some embodiments, the controller 116 calculates and communicates a detected air flow rate to the electronic circuitry 124 or to other monitoring devices. The electronic circuitry 124 or the other monitoring devices can then generate warning signals or provide cooling control signals based on the reported air flow rate from the controller 116.

Figure 2:
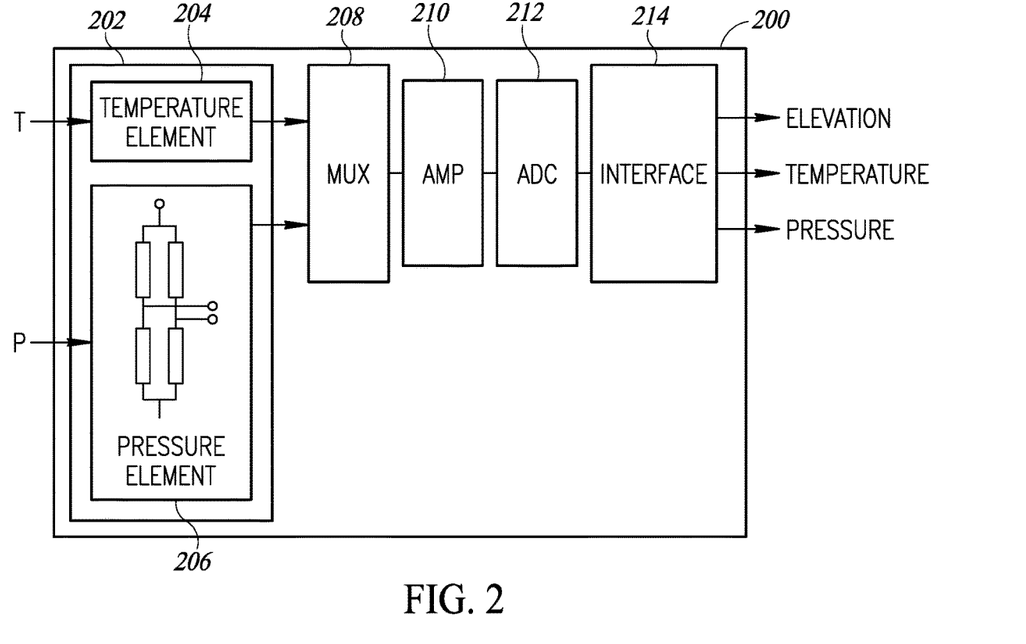
FIG. 2 is a block diagram of a pressure sensor used in the air flow measurement system in one embodiment.

FIG. 2 is a block diagram of a pressure sensor 200 used in the air flow measurement system 108 in one embodiment. The pressure sensor 200 can be an absolute atmospheric (barometric) pressure sensing device or any other kind of pressure sensing device. For example, the pressure sensor 200 can be an LPS25HB pressure sensor made by STMicroelectronics, having a barometric pressure detection range between 260 and 1260 millibar (or hectopascals) with pressure sensitivities of 0.01 millibar sampled at 200 samples per second.

The pressure sensor 200 is shown with sensing elements 202 that include a temperature element 204 and a pressure element 206. The temperature element 204 detects a temperature T and the pressure element 206 detects a pressure P. The pressure element 206 is shown as a Wheatstone bridge piezoresistive pressure sensor. Other implementations of a pressure sensor are also compatible with the air flow measurement system 108.

The pressure sensor includes additional components to provide signal processing to the signals produced by the sensing elements 202. The pressure element and the temperature element are coupled to inputs of a selector (MUX) 208. In some implementations the selector is a multiplexer. The selector 208 can select either of the elements 204, 206 for reading by the other components of the pressure sensor 200, or isolate both elements from the other components.

The output of the selector 208 is coupled to an amplifier 210, which amplifies the selected signal from the sensing elements 202. The amplifier 210 sends the amplified signal to an analog-to-digital converter (ADC) 212 for conversion from an analog signal to a digital signal. The digital signal is communicated to a signal interface 214 from the analog-to-digital converter 212, with the signal interface 214 providing digital signal processing to perform calculation of derived values from the pressure and temperature detected by the sensing elements 202, such as pressure altitude, and to prepare the data for communication off of the pressure sensor 200, such as by structuring the data for communication over an $I_2C$ or SPI connection, or under some other protocol, to the controller 116. The interface can generate one or more of pressure altitude (elevation), temperature, and pressure to be output from the pressure sensor 200. A low pass filter may also be implemented in the air flow measurement system 108. For example, the low pass filter may be positioned between the amplifier and the analog-to-digital converter 212. Alternatively, the low pass filter can be implemented as a digital filter in the interface. In another implementation, the filter is a separate component between the pressure sensor 200 and the controller 116.

Figure 3:
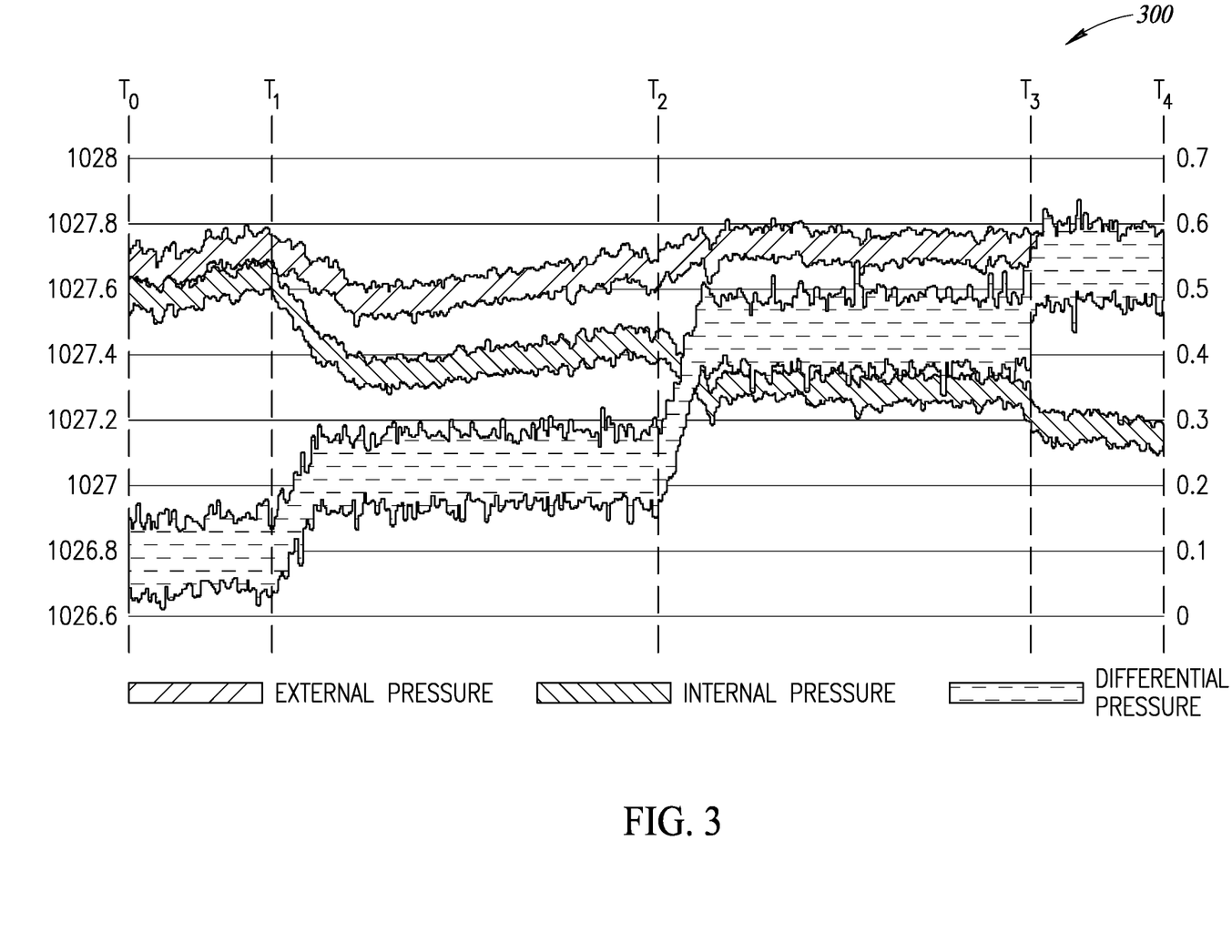
FIG. 3 depicts a graph of pressures detected by pressure sensors and pressure differentials over time.

FIG. 3 depicts a graph of pressures detected by pressure sensors and pressure differential over time. An absolute pressure graph 300 shows a range of pressures in millibar ranging from 1026.6 to 1028.0 on the left-hand y-axis, and a range of pressure differentials in millibar from 0.0 to 0.7 on the right-hand y-axis. The x-axis reflects a time period, such as a time period of sixty seconds, for example. The external pressure, such as the absolute pressure detected by the external pressure sensor 110, is represented with the area filled with slashes. The internal pressure, such as the absolute pressure detected by the internal pressure sensor 114, is represented with the area filled with backslashes. The internal pressure and external pressure on the absolute pressure graph 300 are measured against the left-hand y-axis. The difference in the external pressure and the internal pressure is shown as the differential pressure, which is represented with the area filled with dashes. The differential pressure on the absolute pressure graph 300 is measured against the right-hand y-axis.

The absolute pressure graph 300 depicts the pressures associated with the outlet fan 120 running at different power levels at different times. The outlet fan 120 is set to a 25% power level between $T_0$ and $T_1$, a 50% power level between $T_1$ and $T_2$, a 75% power level between $T_2$ and $T_3$, and a 100% power level between $T_3$ and $T_4$. As the power levels of the fan are increased, the differential pressure is shown having a corresponding increase. In this configuration, as the outlet fan 120 is powered to increasing levels, the pressure in the enclosure 102 is increasingly depleted as the outlet fan 120 works to remove air from the enclosure 102. As the air pressure is increasingly depleted, the differential pressure is shown progressively increasing. In other configurations, the inlet fan 122 may cause the internal pressure to increase above the ambient level. In either configuration, because of the difference in pressure, air will flow through vents and orifices to equalize with the ambient air outside of the enclosure 102.

The air flow measurement system can use the differential pressure depicted here to determine air flow across the components in the enclosure 102. The system can trigger increases in fan speed anytime the differential pressure falls below a set threshold. In other embodiments, a threshold is a function of additional variables, such as a specific power level, a specific pressure altitude, and an acceptable variability in the pressure differential. The air flow measurement system 108 can then compare the pressure differential to a threshold that is determined for a specific power level of the cooling system, the specific pressure altitude detected by the external pressure sensor, and the acceptable variability in the pressure differential. For example, between $T_1$ and $T_2$, the threshold may be set to at least 0.1 millibar to account for the various factors discussed above, but may be set to at least 0.3 millibar between $T_2$ and $T_3$ to account for the change in power level.

Figure 4:
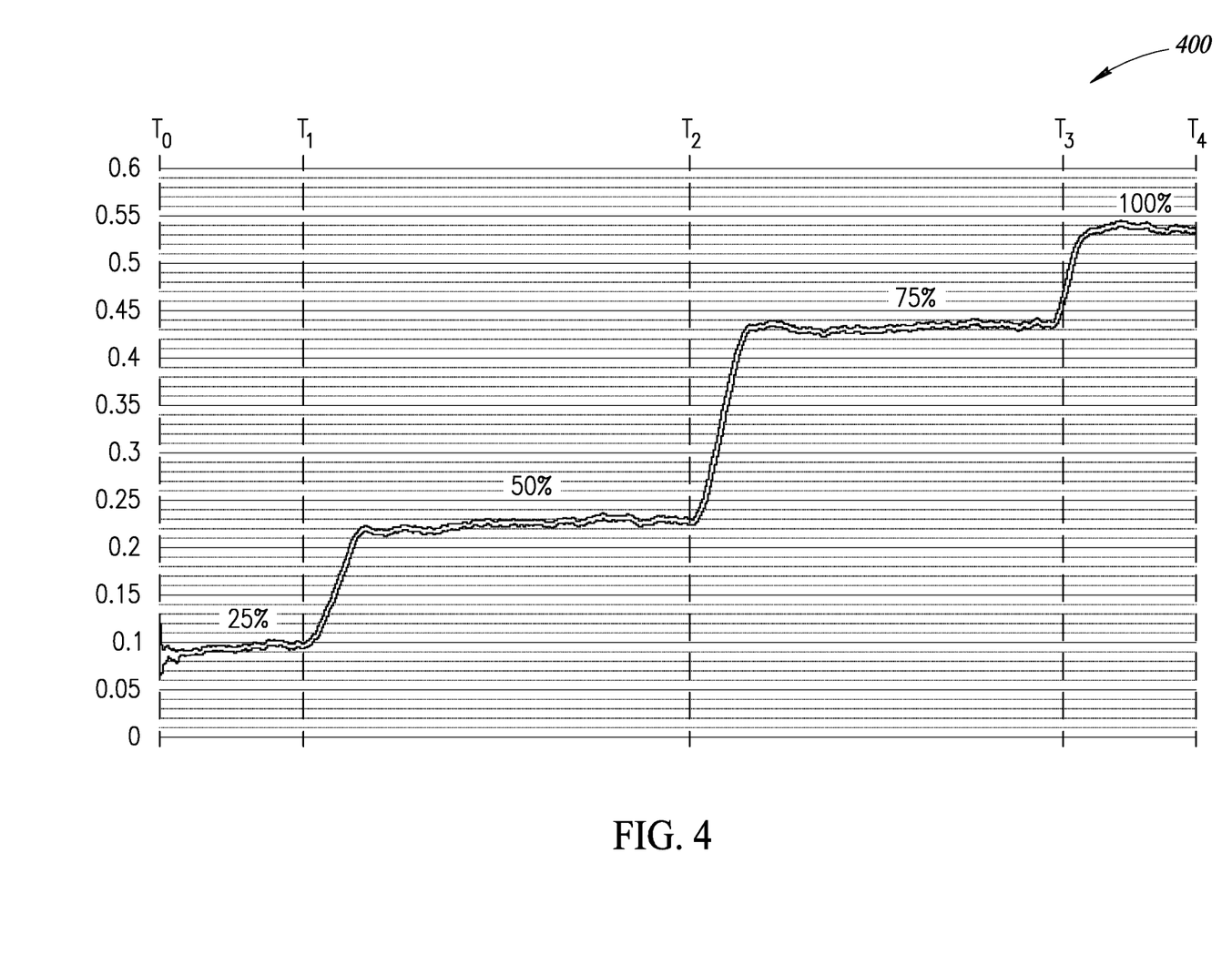
FIG. 4 depicts a graph of pressure differentials over time with signal conditioning as determined by an air flow measurement system of the present disclosure.

FIG. 4 depicts a graph of pressure differentials over time with signal conditioning as determined by the air flow measurement system. A differential pressure graph 400 shows a range of pressure differentials in millibar from 0.0 to 0.6 on the left-hand y-axis. The differential pressure on the differential pressure graph 400 is measured against the right-hand y-axis. The x-axis reflects a time period, such as a time period of sixty seconds, for example. The differential pressure graph 400 depicts the differential pressure shown in the FIG. 3, with low pass filtering applied to the signal. The low pass filtering of the pressure differential demonstrates the relative stability of the pressure sensor differential over time for a given power setting of the cooling system, with the time segments depicted in FIG. 4 corresponding to those depicted in FIG. 3.

Once calibrated, the system can store in a memory the baseline pressure differential at the different motor speeds, 25%, 50%, etc. During operation, the controller can compare the detected pressure differential with the stored baseline pressure differentials to determine if the fans are responding within threshold ranges. If the system determines the fans are not responding to achieve the pressure differentials that match the baseline, the interrupt can be output to have a technician check on the server to avoid a failure.

Figure 5:
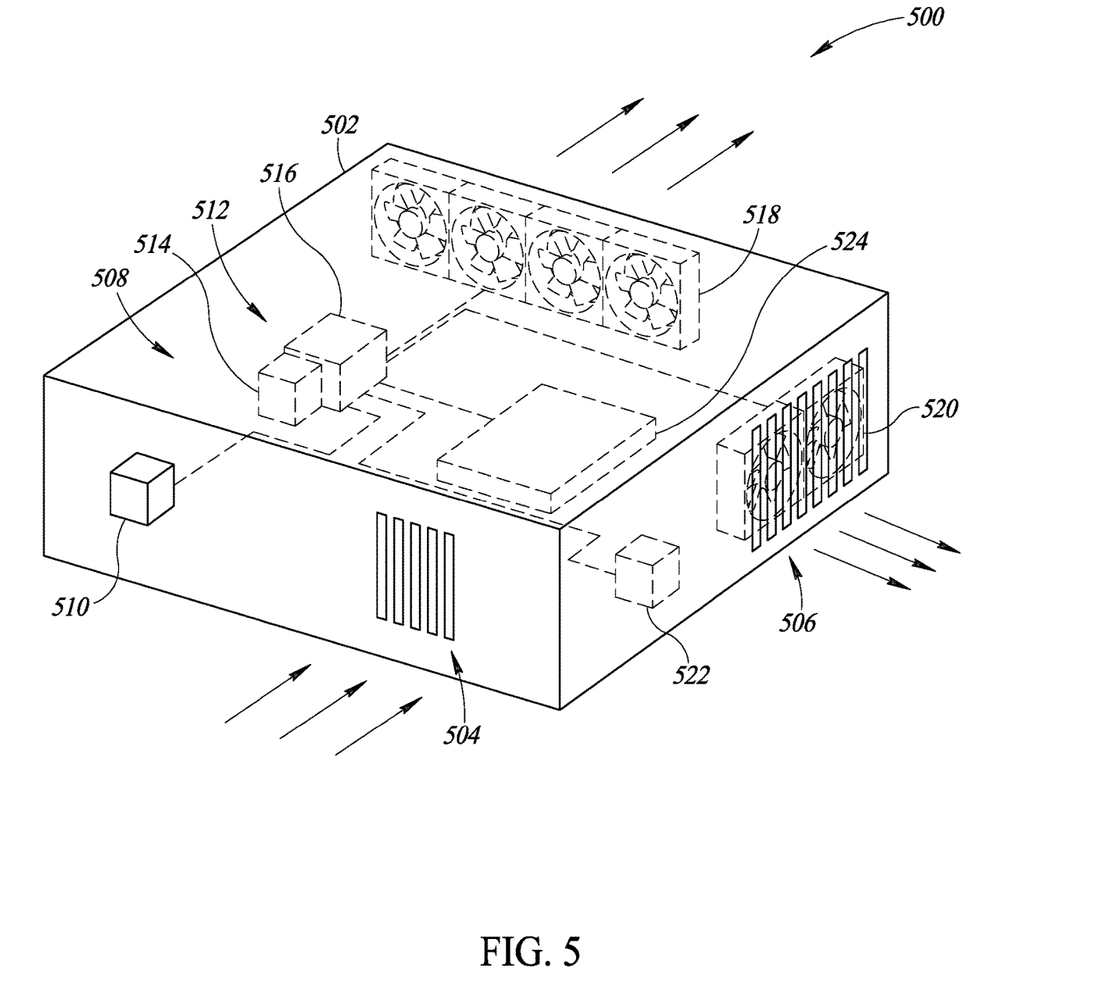
FIG. 5 is an isometric view of a server with one embodiment of an air flow measurement system.

FIG. 5 is an isometric view of a server with one embodiment of the air flow measurement system. A server 500 shares some similarities with the server 100. For example, the server 500 includes an enclosure 502, an inlet vent 504, and an outlet vent 506 similar to the ones described with respect to the server 100. In addition, the server 500 has an air flow measurement system 508 that includes an external pressure sensor 510 and an internal air flow circuit 512, including an internal pressure sensor 514 and a controller 516 that are similar to those described with respect to the server 100. The air flow measurement system 508 also includes an outlet fan bank 518 of four fans, and an outlet fan bank 520 of two fans. The outlet fan bank 518 is coupled to an outlet vent (not pictured), and the outlet fan bank 520 is coupled to the outlet vent 506. Near the outlet fan bank 520 is an internal pressure sensor 522 coupled to the controller 516. The internal pressure sensor 522 can be any of the pressure sensors discussed with respect to the internal pressure sensor 114. Also shown in FIG. 5 is electronic circuitry 524 coupled to the controller 516. The electronic circuitry 524 can be any type of device described with respect to the electronic circuitry 124.

Due to the outlet fan bank 518 being positioned in a different area of an internal volume of the enclosure 502 than the outlet fan bank 520, the pressures in the volumes around each fan bank 518, 520 can vary from one another. This variation can be magnified by the electronic circuitry 524 causing a more substantial partition of the internal volume of the enclosure 502. Thus with the internal pressure sensor 514 and the internal pressure sensor 522, different partitioned volumes of the internal volume can be independently monitored and the corresponding fan bank independently controlled. Thus, as described above, each internal volume can be checked for proper air flow by checking the pressure differential between that volume's corresponding internal pressure sensor and the external pressure sensor 510. In some embodiments, the different fan banks 518 and 520 can be driven together, with a blended solution from the internal pressure sensors 514, 522.

Figure 6A:
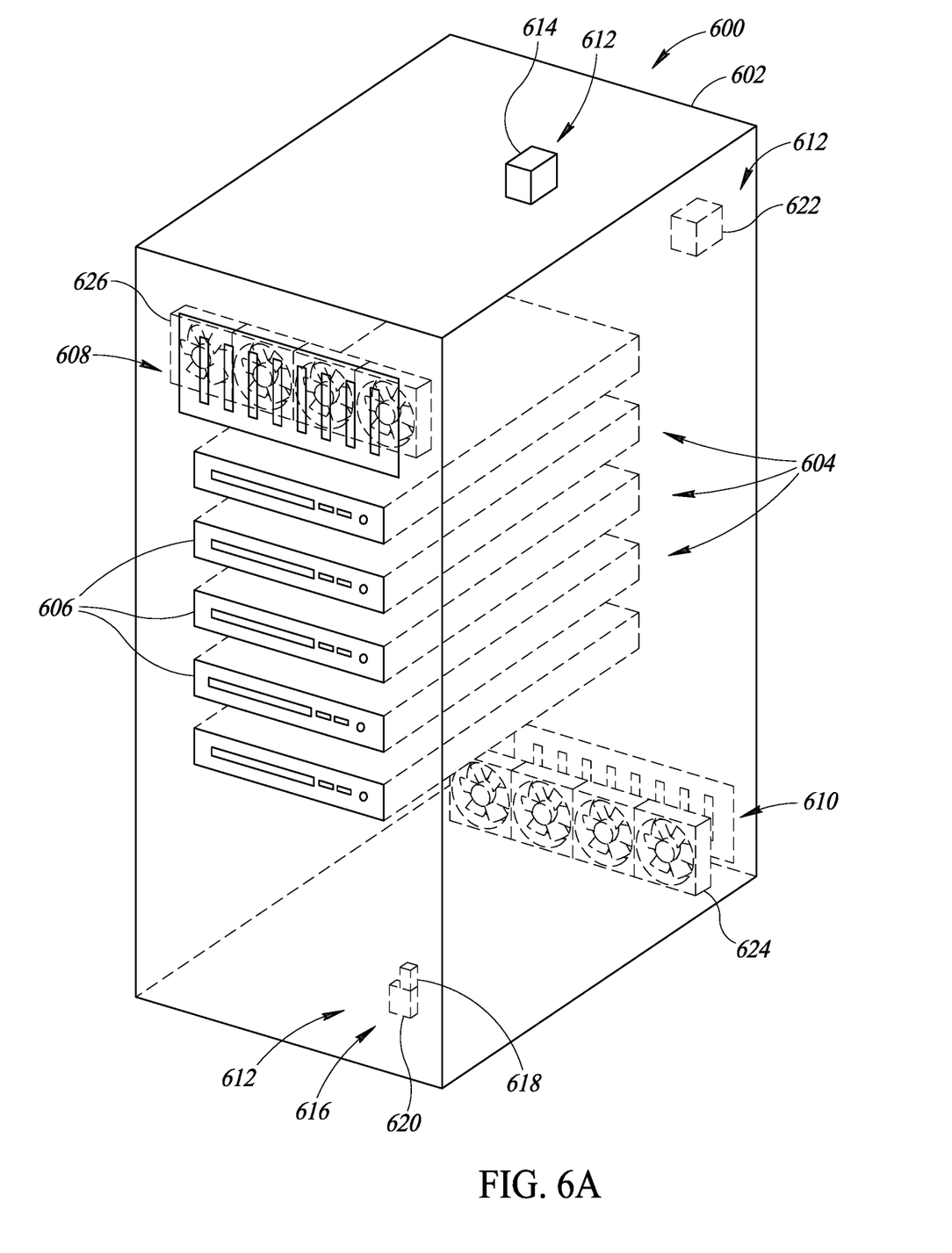
FIGS. 6A and 6B depict an isometric view and a side view of a server cluster with one embodiment of the air flow measurement system.
Figure 6B:
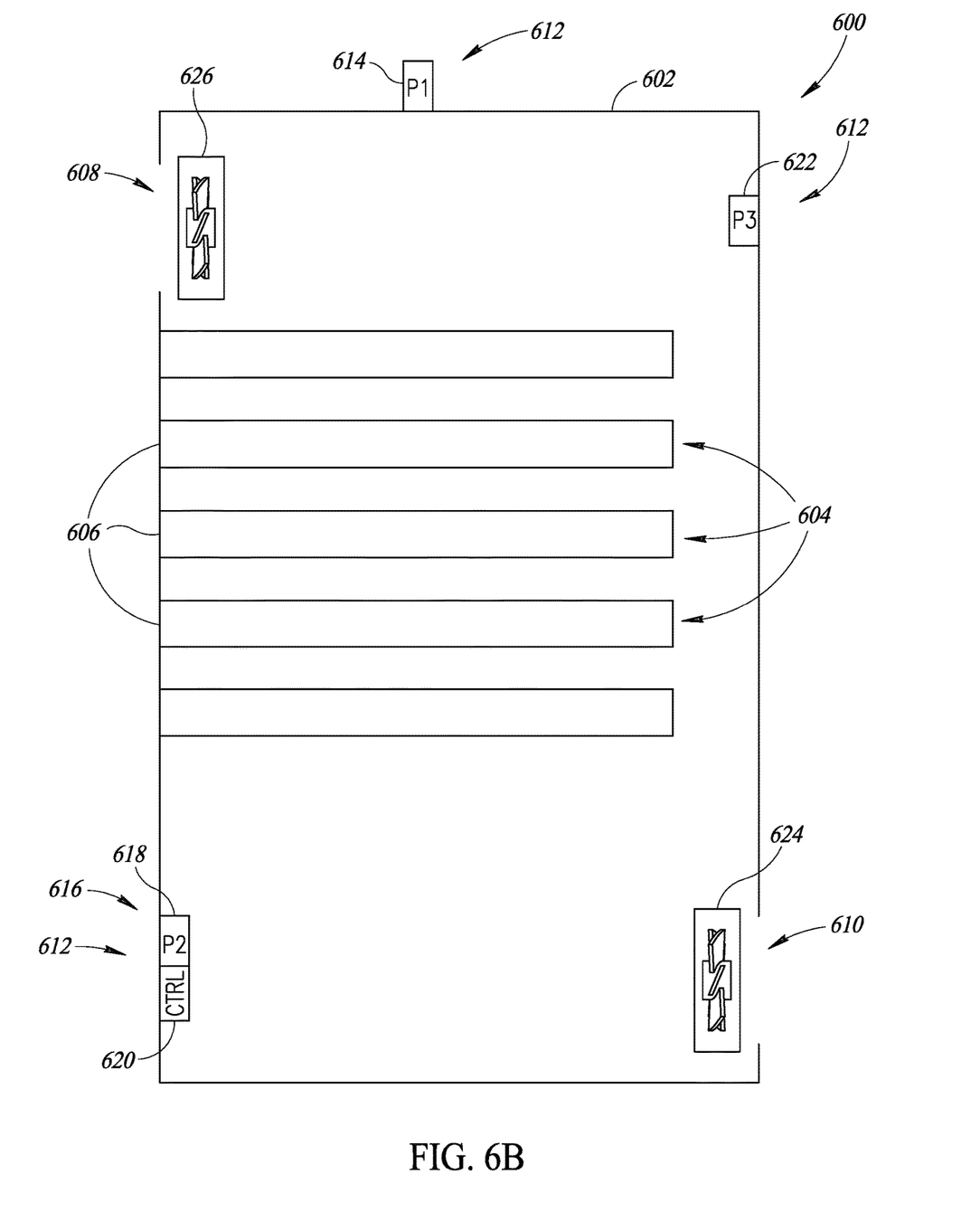

FIGS. 6A and 6B depict an isometric view and a side view of a server cluster with one embodiment of the air flow measurement system. Unlike the previously discussed embodiments, FIGS. 6A and 6B depict a server cluster 600 that includes a plurality of servers 604 housed together. The plurality of servers 604 each may be any of the types described above with respect to the server 100. The server cluster 600 may also be a server farm or a server network. The server cluster 600 is housed in a server cabinet 602. The server cabinet 602 may also be a server rack, a server enclosure, a server stand, or any other name for a structural support for a plurality of interconnected servers. The plurality of servers 604 are housed in respective ones of a plurality of server enclosures 606 stacked on top of one another. The server cabinet 602 includes an inlet vent 608 above the plurality of servers 604 and an outlet vent 610 below the plurality of servers 604.

FIGS. 6A and 6B depict an air flow measurement system 612 that includes external pressure sensor (P1) 614, an internal air flow circuit 616 including an internal pressure sensor (P2) 618 and a controller 620, and an internal pressure sensor (P3) 622. The pressure sensors can be positioned at any location within the server tower. The air flow measurement system 612 operates similarly to the air flow measurement systems 108, 508 discussed above, but within a larger enclosure. For example, outlet fan bank 624 can be associated with a lower volume of the server cabinet 602, with a pressure differential between the lower volume and the external ambient air determined by the internal pressure sensor 618 and the external pressure sensor 614. Likewise, inlet fan bank 626 can be associated with an upper volume of the server cabinet 602, with a pressure differential between the upper volume and the external ambient air determined by the internal pressure sensor 622 and the external pressure sensor 614. The controller 620 can then independently control each fan bank 624, 626, or report on status of each fan bank 624, 626 separately to one or more of the plurality of servers 604, or to some other monitoring device.

While the foregoing discussion is directed towards embodiments with an air cooling system, other temperature systems can also be implemented using the same techniques. For example, a gas cooling system can be implemented in which a specific gas is captured and contained in an area around a circuit, and pressure differentials are used to monitor gas flow around the system. In other embodiments, the air flow can be used to heat a component that is consuming heat energy. And in yet another embodiment, the system can be implemented with any fluid, such as a water cooled circuit.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A device, comprising:
an external pressure sensor that is mounted externally with respect to an enclosure, the external pressure sensor including a first temperature sensor;
a first internal pressure sensor that is mounted internally with respect to the enclosure; and
a controller coupled to the first internal pressure sensor and the external pressure sensor, the controller operable to output a signal based on a difference between a pressure detected by the external pressure sensor and a pressure detected by the first internal pressure sensor,
wherein the signal is a warning interrupt signal, the controller being operable to communicate the signal to a server, and
wherein the device is configured to determine an elevation based on an external pressure sensed by the external pressure sensor and a temperature sensed by the first temperature sensor.

2. The device of claim 1 wherein the first internal pressure sensor includes a second temperature sensor, the pressure detected by each of the pressure sensors based on a temperature detected by each respective temperature sensor.

3. The device of claim 1, further comprising:
a fan motor driver coupled to the controller, the signal being a power setting signal and the fan motor driver operable to drive a fan at a power level based on the signal.

4. The device of claim 1, further comprising:
a circuit board, the first internal pressure sensor and the controller mounted on the circuit board.

5. The device of claim 1 wherein the controller is configured to control a first fan and a second fan.

6. The device of claim 5, further comprising:
a second internal pressure sensor that is mounted internally with respect to the enclosure and is coupled to the controller, the first internal pressure sensor operable to detect pressure in a first volume adjacent to the first fan and the second internal pressure sensor operable to detect pressure in a second volume adjacent to the second fan, the controller operable to output the signal based on a difference between the pressure detected by the external pressure sensor and a pressure detected by the second internal pressure sensor.

7. The device of claim 1, further comprising:
a low pass filter coupled between the first internal pressure sensor and the controller.

8. A system, comprising:
an enclosure having a first vent and a second vent;
a first pressure sensor positioned outside of the enclosure;
a second pressure sensor positioned in an interior of the enclosure;
a controller coupled to the first pressure sensor and the second pressure sensor, the controller configured to output a warning interrupt signal based on a difference between a pressure sensed by the first pressure sensor and a pressure sensed by the second pressure sensor; and
a first fan positioned in the interior of the enclosure and coupled to the controller,
wherein the first pressure sensor and the second pressure sensor each include a temperature sensor,
wherein the first pressure sensor is configured to determine an elevation based on the pressure sensed by the first pressure sensor and a temperature sensed by the temperature sensor of the first pressure sensor.

9. The device of claim 8 wherein the first fan is aligned with the first vent.

10. The device of claim 9, further comprising:
a second fan positioned in the interior of the enclosure and coupled to the enclosure.

11. The device of claim 10, further comprising:
a third pressure sensor positioned in the interior of the enclosure, the second pressure sensor closer to the first fan than the second fan and the third pressure sensor closer to the second fan than the first fan.

12. The device of claim 10 wherein the enclosure includes a third vent, the second fan being aligned with the third vent.

13. The device of claim 8, further comprising:
a fan motor driver positioned in the interior of the enclosure, the fan motor driver coupled between the controller and the first fan.

14. The device of claim 8 wherein the system is a server having circuitry positioned in the interior of the enclosure.

15. The device of claim 8 wherein the controller is configured to output the warning interrupt signal in response to the difference between the pressure detected by the first pressure sensor and the pressure detected by the second pressure sensor being less than an expected pressure differential.

16. The device of claim 8, further comprising:
a circuit board, the first pressure sensor and the controller mounted on the circuit board.

17. The device of claim 8, further comprising:
a low pass filter coupled between the first pressure sensor and the controller.

18. A method, comprising:
detecting a first pressure outside of an enclosure by a first pressure sensor, the enclosure including a first electronic circuit and a fan inside the enclosure;
detecting a second pressure inside the enclosure by a second pressure sensor;
comparing the first pressure to the second pressure;
generating a warning interrupt signal based on the comparing the first pressure to the second pressure;
detecting a temperature by a temperature sensor within the first pressure sensor;
determining an elevation based on the temperature and the first pressure; and
reporting the warning interrupt signal, the temperature, and the elevation to circuitry inside the enclosure.

19. The method of claim 18, further comprising:
monitoring airflow based on a pressure differential between the first pressure and the second pressure; and
adjusting a power setting of the fan inside the enclosure based on the monitoring airflow.

20. The method of claim 18 wherein the warning interrupt signal is generated when the comparing of the first pressure to the second pressure indicates that a server cooling fan is malfunctioning.

\* \* \* \* \*